(No Model.)
2 Sheets—Sheet 1.
E. ANDERSON.
DRILLING MACHINE.
No. 311,709.  Patented Feb. 3, 1885.
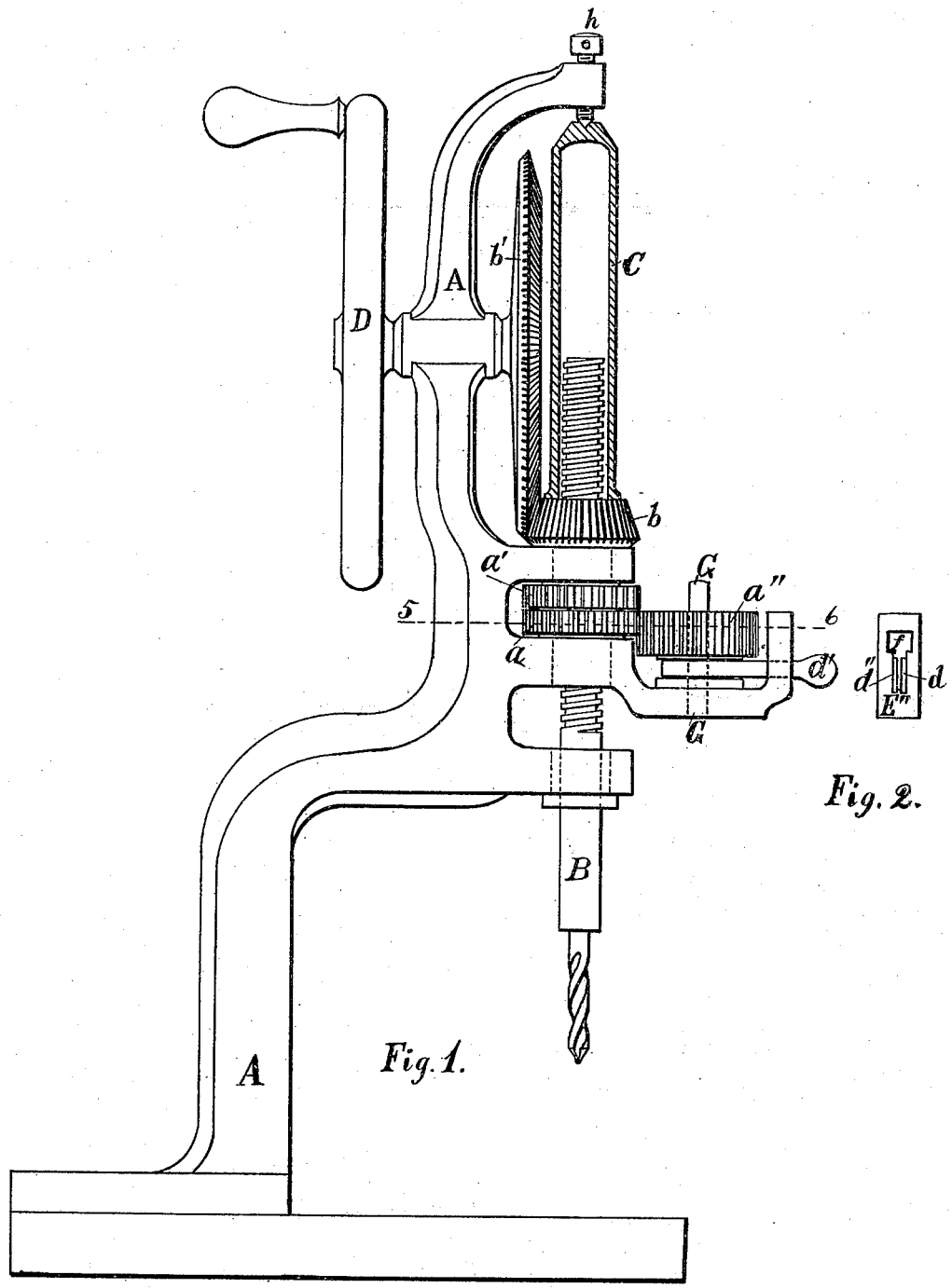

(No Model.) 2 Sheets—Sheet 2.
E. ANDERSON.
DRILLING MACHINE.
No. 311,709. Patented Feb. 3, 1885.
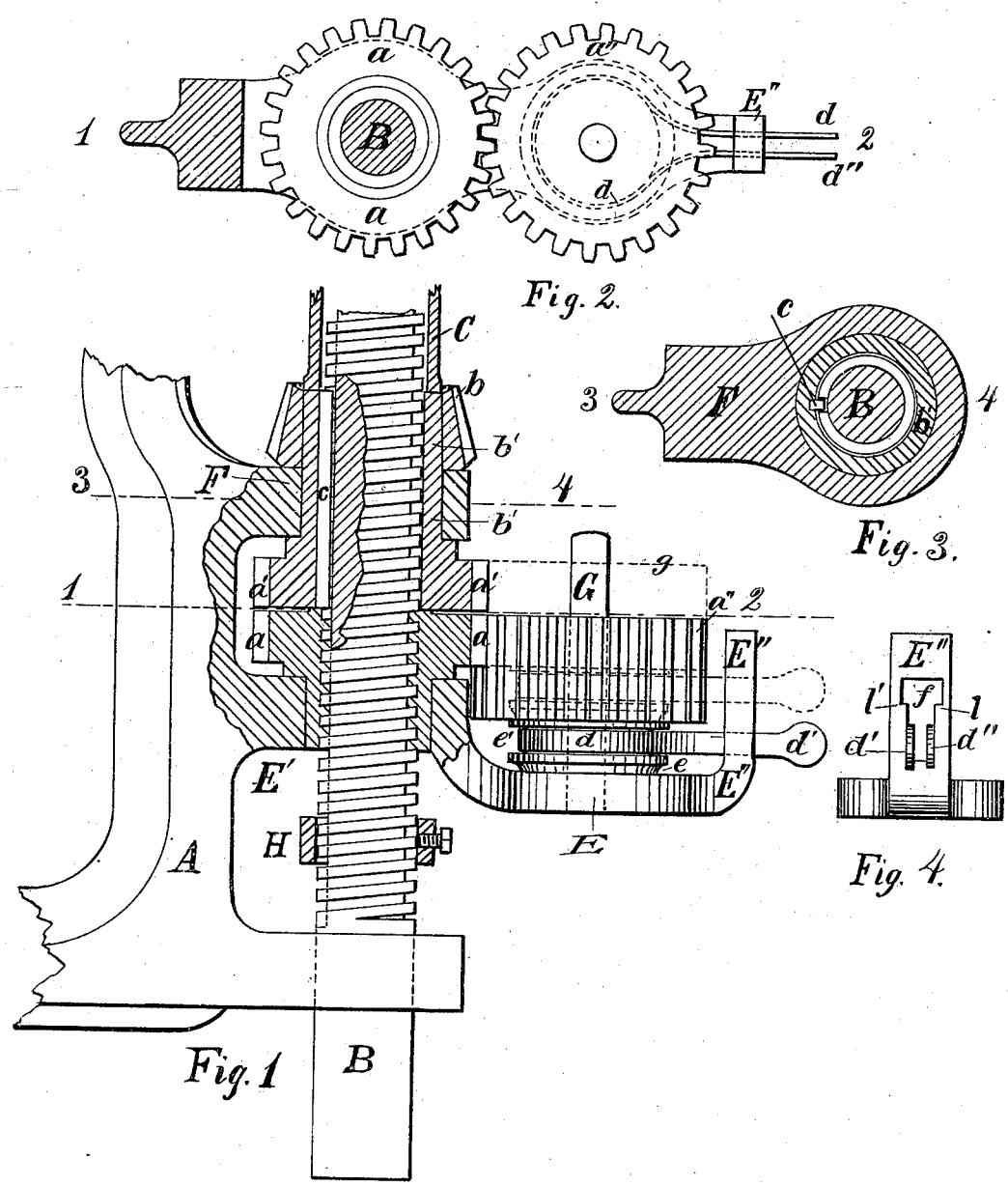
Witnesses:
Stephen Lenh
Allen Barger
Inventor:
Euclid Anderson

UNITED STATES PATENT OFFICE.

EUCLID ANDERSON, OF PEEKSKILL, NEW YORK.

DRILLING-MACHINE.

SPECIFICATION forming part of Letters Patent No. 311,709, dated February 3, 1885.

Application filed January 5, 1884. (No model.)

*To all whom it may concern:*

Be it known that I, EUCLID ANDERSON, a citizen of the United States, residing at Peekskill, in the county of Westchester and State of New York, have invented a new and useful Drilling-Machine, of which the following is a specification.

My invention relates to improvements in drilling-machines which have an automatic feed mechanism for the drill; and my object is to afford an exceedingly simple positive feed, which may be also used for a variable feed. I attain these objects by the mechanism illustrated in the accompanying drawings, in which—

Sheet 1 represents a view of my improvement as applied to a hand drilling-machine. Sheet 2 sets forth the various parts in detail, similar letters having reference to similar parts throughout the several views. Figure 1, Sheet 2, is a section of the view on Sheet 1 through the line 5 6. Fig. 2 is a horizontal section through line 1 2, Fig. 1. Fig. 3 is a horizontal section through line 3 4, Fig. 1. Fig. 4 is a front view of E″, Fig. 1. Fig. 2, Sheet 1, is also a front view of E″.

A is the frame of the drilling-machine.

B is the drill-spindle, which passes freely through a sleeve, $b'$, splined to the spindle, as shown at $c$, Figs. 1 and 3, Sheet 2. The spindle is driven by a pinion, $b$, rigidly attached to the sleeve $b'$, the latter having a bearing in the part F of the frame. The spindle has a thread formed on the upper part of it, which traverses the nut $a$, which is a spur-wheel forming part of the well-known "differential" feeding device. The nut $a$ has a hub, which passes through and finds a bearing in the extension E′ of the frame.

$a'$ is a spur-wheel of the same diameter as $a$, which embraces the spindle adjacent to $a$, and which is rigidly attached to or is formed on the lower end of the sleeve $b'$, and acts as the driver of the differential device. The extension E″ of the frame supports the stud G, which acts as a bearing for the intermediate spur-wheel, $a''$, and is high enough to allow of the shifting of $a''$ into or out of gear with $a'$. The wheel $a''$ is broad-faced enough to remain in gear with $a$ at all times. The intermediate wheel, $a''$, is shifted into or out of gear with $a'$ by means of the piece $d$. It consists of a strip of metal bent around and clasping the lengthened hub of $a''$ and lies in a groove, $e'$, in said hub. (See Figs. 1 and 2, Sheet 2.) The ends of this strip are brought near to each other, so as to form convenient finger-pieces $d'$ $d''$, and the whole is kept in position by the groove $e'$ and a slot, $f$, in the upright extension E″, Figs. 1 and 4.

The dotted line $g$, Fig. 1, Sheet 2, shows the shifted or upper position of $a''$. The parts $d'$ $d''$ of the shifter springing into the notches $l$ $l'$, Fig. 4, keep it in position. The shifter $d$ also serves, when the ends are pressed together by the fingers, as a brake for retarding the motion of $a''$ when out of gear with $a'$, thereby enabling the operator to produce a variable feed. An adjustable collar, H, is placed on the spindle to limit the upward motion of the same, which it does by striking the lower end of the hub of nut $a$ and causing it to revolve with the spindle.

In order to lessen the friction that would otherwise occur at the bearing between $a'$ and extension F when the machine is boring, I place a tube or sleeve, C, over the upper end of the spindle, one end of which abuts against the sleeve $b'$, and the other end, which is provided with a steel head, against the center $h$, which forms the end of a set-screw, as shown. This center receives the upward thrust of the drill when at work, and affords a bearing much smaller in diameter than would be possible at the only other available point.

In operating the drill, if a regular automatic feed is required, the shifter $d$ is moved to the upper position, thereby bringing the three spur-wheels into gear. The spindle will then be advanced at a rate depending on the difference in the number of teeth in the wheels $a$ and $a'$. If a greater or less amount of feed is required than the differential arrangement affords, the shifter is left in its lower position, with $a''$ out of gear with $a'$. In this position $a$ and $a''$ will continue to revolve with the spindle, and the latter will not be advanced through the nut $a$ unless the motion of the nut is retarded. Any degree of retardation may be effected by applying pressure to the brake or shifter $d$. Pressure of the fingers on the finger-pieces $d'$ $d''$ tends to close the brake around the intermediate $a''$ and retards it and also the nut $a$, with which it is geared.

I am aware that differential feeding mechanism of the nature above set forth has been used; and I am also aware of the previous use of variable feeding devices operated by friction. I therefore do not claim, broadly, the application of such features to a drilling-machine.

I claim—

1. The combination, in a drilling-machine, of the traversing threaded spindle B, driver or pinion $b$, differential feed mechanism $a\ a'\ a''$, shifter $d$, sleeve C, and adjustable center $h$, substantially as described.

2. The combination, with the differential feed mechanism of a drilling machine, as above described, of the combined shifter and friction-brake $d$, substantially as shown.

EUCLID ANDERSON.

Witnesses:
ALLEN BARGER,
NICHOLAS MANSFIELD.